Sept. 4, 1956 H. KING 2,761,217
MACHINE ALIGNMENT DETECTOR
Filed Feb. 3, 1950 2 Sheets-Sheet 2
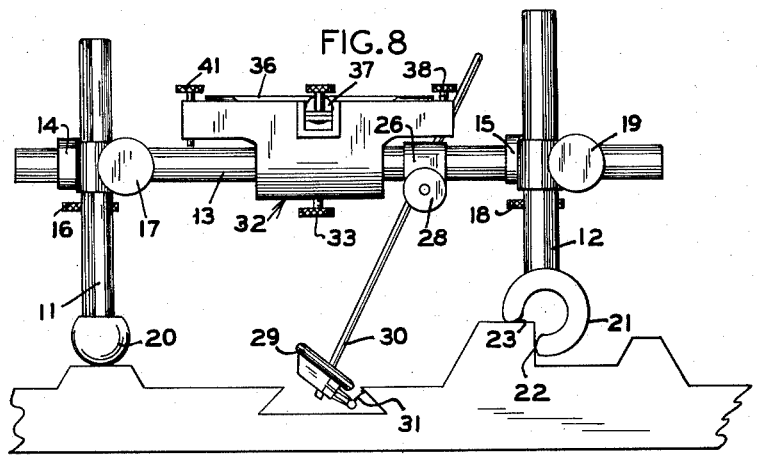
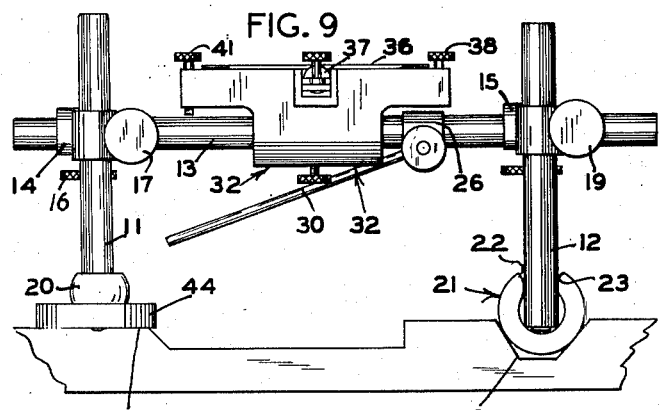
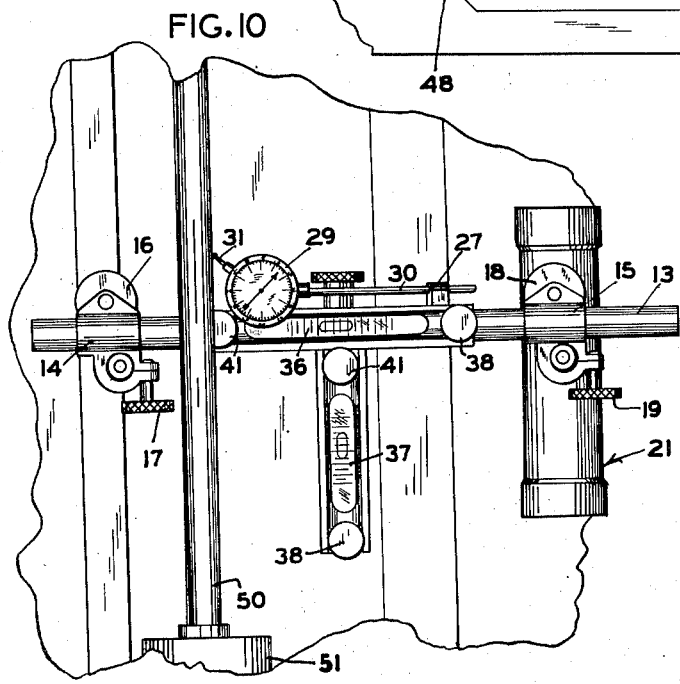
INVENTOR
HERMAN KING
BY
Williamson & Williamson
ATTORNEYS United States Patent Office 2,761,217
Patented Sept. 4, 1956

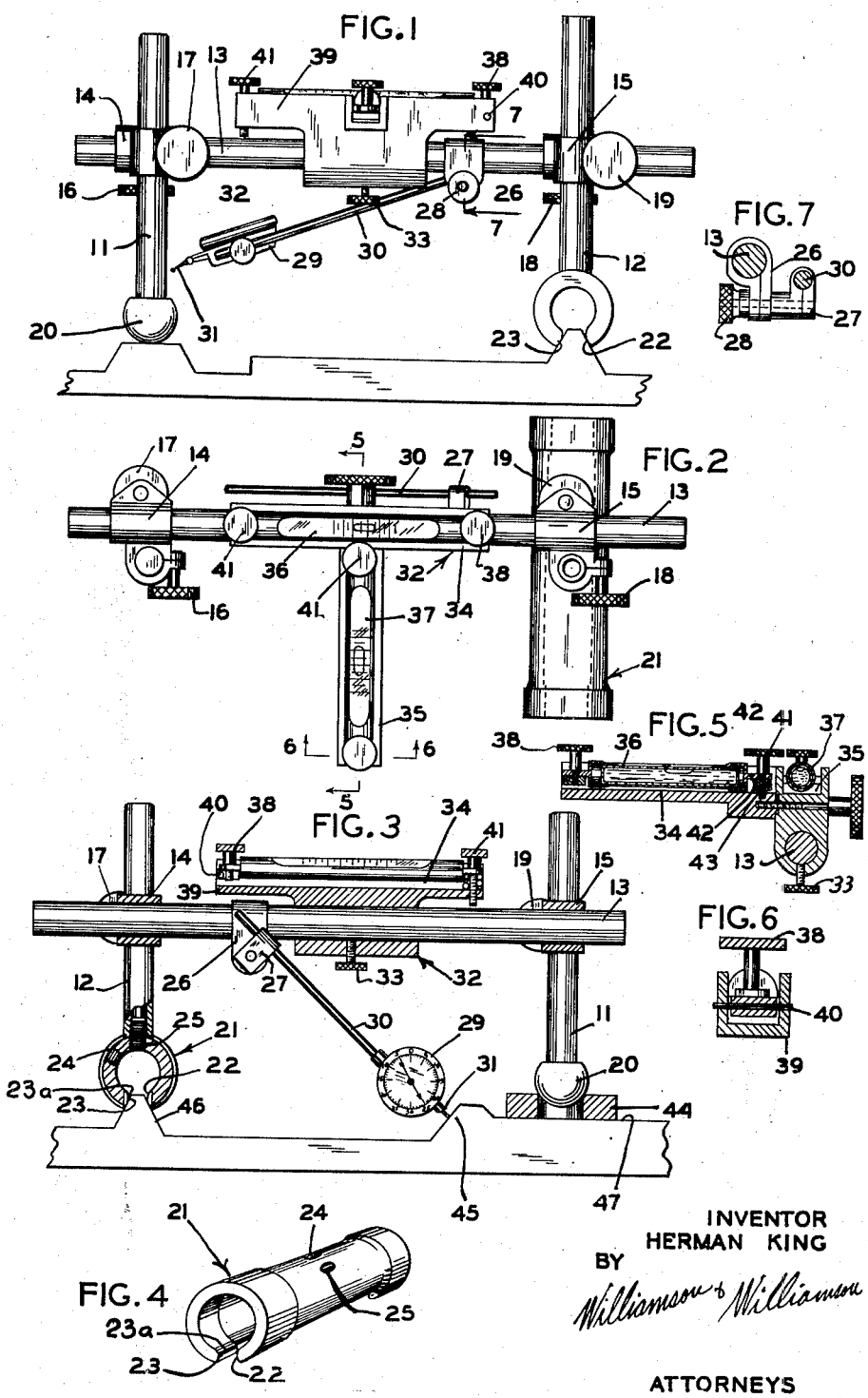

2,761,217

MACHINE ALIGNMENT DETECTOR

Herman King, Minneapolis, Minn., assignor to King Instrument Co., Minneapolis, Minn., a corporation of Minnesota Application February 3, 1950, Serial No. 142,284

12 Claims. (Cl. 33—174)

This invention relates to detectors for determining the correctness of alignment of machine parts.

In many machines, such as lathes, milling machines, etc., beds are employed carrying ways which guide a movable superstructure and the surfaces of these ways must be in exact alignment relative to each other if accurate work is to be done by the machines. It is also necessary in certain machines, such as lathes, that rotatable parts, such as the chucks and spindles of the lathes, be in exact alignment with the various ways carrying superstructure for supporting the work and the working tool. During the time that such machines are being constructed, it is desirable to provide detectors which will accurately determine the accuracy of alignment of ways, channels, grooves, and other machine parts so that the surfaces of these parts can be originally accurately formed. Also after machines, such as referred to, have been operated for some time, such surfaces become worn or out of alignment and it is then necessary to true up these surfaces to put the machine back into condition to allow accurate work to be performed thereby.

It is an object of the present invention to provide a simple machine alignment detector which can be used with great ease to determine the relative alignment between the surfaces of machine parts, thereby enabling the truing of these parts with a minimum of labor.

In greater particular, it is an object of the invention to provide a machine alignment detector which can be worked over such a part as a way on a machine bed to determine which portions thereof are out of alignment and to what extent this is so.

Another object is to provide a machine alignment detector which has essentially a three-point support whereby any non-alignment of portions of the machine surface over which it is being worked will be indicated in such a magnified manner as to become readily apparent to the user.

Another object is to provide a machine alignment detector which will indicate in a readily readable manner the portions of a surface of a machine which are not in alignment with a selected surface regardless of their relative elevations, positions, shapes, or sizes.

Another object is to provide a machine alignment detector which will indicate in a readily readable manner the extent to which a surface is out of alignment with a reference surface, and at the same time indicate whether the non-alignment is in a vertical or lateral direction or both.

A further object is to provide a machine alignment detector for determining the alignment of a machine surface regardless of its shape and position which is readily adjustable for that purpose.

These and other objects and advantages of my invention will more fully appear from the following description made in connection with the accompanying drawings wherein like reference characters refer to similar parts throughout the several views, and, in which:

Fig. 1 is a side elevational view of one embodiment of my invention being utilized to align a flat-way and a male V-way of a carriage bed;

Fig. 1 is a top plan view of the instrument shown in Fig. 1;

Fig. 3 is a vertical sectional view of the machine alignment detector being used to align one side wall of a male V-way;

Fig. 4 is a perspective view of the slotted cylindrical base of one of the standards of the instrument;

Fig. 5 is a sectional view along line 5—5 of Fig. 2;

Fig. 6 is a sectional view along line 6—6 of Fig. 2;

Fig. 7 is a sectional view along line 7—7 of Fig. 1;

Fig. 8 is a side elevational view of the instrument being used to align one wall of a female dovetail way;

Fig. 9 is a side elevational view of my invention being utilized to true a female V-way against a scored flat-way when it is desired to ignore the scores;

Fig. 10 is a top plan view of my invention being utilized in conjunction with a test bar to check the alignment of the spindle of the machine in relation to the way.

As shown, my invention includes a pair of spaced parallel standards 11 and 12 which have a stretcher or rod 13 extending therebetween and secured thereto by means of a pair of adjustable clamps 14 and 15. These clamps 14 and 15 each have two passages extending at right angles to each other through their medial portions for receiving one of the standards and one end portion of the stretcher 13. The end portions of these clamps have a slot formed therein which communicates with the passages to provide the necessary adjustability when their respective knurled tightening screws 16, 17, and 18, 19, are loosened or tightened. Threaded onto the lower end portion of the one standard 11 is a base in the form of a ball 20. Threaded onto the lower end portion of the other standard 12 is a base or foot 21 in the shape of a slotted hollow cylinder. This base or foot 21 has a slot 22 which is formed within what is normally its bottom surface along its entire length. The edges along the slot 22 are cut away on both sides except for short distances at the ends thereof, as shown at 23 in Fig. 4 to form opposed bars 23a, to provide essentially a two-point support for the base 21 one at each end. This base or foot 21 has an aperture 24 located in its medial portion and substantially opposite the slot 22. This aperture 24 has a thread formed within it which permits it to receive the standard 12 either from the top as shown in Fig. 1 or from the bottom and through the slot 22 as shown in Fig. 9. A second aperture 25 is formed laterally of the aperture 24 to permit the foot 21 to receive the standard 12 at an angle, as shown in Fig. 8.

Mounted on the stretcher 13 for rotational movement relative thereto is a clamp 26 and a second clamp 27, both of which can be tightened or loosened by means of a knurled tightening screw 28. The relative positions of the two clamps 26 and 27 provide universal movement for a test indicator 29 which is mounted on a rod 30 and carried by the clamp 27. The test indicator 29 has a registering point 31 which is adapted to transmit indications of pressure to the indicator which in turn registers the intensity of the same on its dial. The position of the indicator 29 can be readily changed by loosening the tightening screw 22 and then moving the indicator 29 to its desired position.

Mounted on the medial portion of the stretcher 13 is a level mount 32 which is held in place by a tightening screw 33. When the tightening screw 33 is loosened it is possible to move the level mount 32 longitudinally of the stretcher 13 or to rotate it thereabout. The level mount 32 has one upwardly facing channel 34 which extends longitudinally of the stretcher 13 and another upwardly facing channel 35 which extends transversely and laterally of the channel 34. Each of the channels 34 and 35 are formed to receive a spirit level 36 and 37. These two spirit levels 36 and 37 are mounted in similar fashion within their respective channels 34 and 35. One end of each spirit level is secured by a knurled-tightening screw 38 to a pivot block 39 which is pivotally secured to the sides of the channel by a pinion 40 which extends therethrough and into the sides of the channel in apertures provided therefor. The opposite end of each of the levels is adjustably secured to the bottom of the opposite end of the channel by means of a knurled-tightening screw 41 which extends through a flange portion 42 having an aperture provided therein to receive the same and which engages the bottom of the channel in a threaded aperture provided therefor. The screw 41 extends through a compression spring 43 which is disposed between the bottom of the channel and the flanged portion 42.

For certain purposes a flat ring 44 is used in co-operation with the ball 20, as shown in Fig. 3, where one side wall of a male V-way 45 is being aligned relative to a second male V-way 46 and a flat-way 47. Fig. 9 shows the ring 44 being used to true a scored flat-way 48 relative to a female V-way 49.

Fig. 10 shows the test indicator being run along a test bar 50 to true up the chuck 51 or the spindle (not shown) relative to the bed-way.

Operation

My machine alignment detector is easy and simple to operate. To align any two surfaces of a bed or way the user only has to place the ball 20 upon one of them and the slotted cylindrical base 21 on the other, as shown in Fig. 1. It is possible to adjust the spacing of these two bases by loosening the screws 16 and 18. It is also possible to move the stretcher 13 to the desired approximate level position by loosening the screws 17 and 18. Once this has been accomplished the screws are all tightened and the finer adjustments can be made. To make the starting surface a reference surface both of the levels 36 and 37 are adjusted by means of their screws 41 until they indicate level position. Once this has been accomplished, the surfaces beneath the bases 20 and 21 become reference surfaces and the instrument is ready to be moved along the way. As it is brought along the bed or way any misalignment of the surfaces contacted by the bases 20 and 21 will be reflected in the spirit levels 36 and 37. The extent of the misalignment relative to the reference surface is indicated by the extent to which the level bubbles are displaced toward either end of the levels. Any convex or concave shape in the surfaces will be reflected by the level 37. Any changes in elevation will be reflected in the level 36. Any twisting or curvature of the way will be reflected in the level 37. After the misalignment is located, it is a comparatively easy matter to hand-scrape the surface until it is once more aligned. It can be readily seen that my invention provides an easier and quicker means for aligning machine surfaces than methods previously known which required many hours of tedious labor. These prior methods are much less accurate since it is impossible with a single level to accomplish what my device accomplishes. For example, it is impossible to place a level in one spot, move it to determine if the surface is level in the opposite direction, and then return it to its exact original position.

It should be noted that my device provides essentially three-point support for the levels. Although actually four points touch at the corners of the base 21, it has essentially two-point support, since in reality it is merely the two ends of the base which are supporting the standard. The ball 20 provides the third point of support. Any wear which occurs on these bases is immaterial since it is all corrected for by the adjustment of the levels prior to movement of the device along the way.

Fig. 1 shows how the two side walls of a V-way can be trued against a flat-way. Any twist or curvature in the V-way will cause one end of the base 21 to raise or lower and that will be reflected in the level 37.

Fig. 3 shows how my invention can be utilized to true up one side of a male V-way after a flat-way and a first V-way have been aligned relative to each other. The ring 44 is utilized so as to eliminate the effect of any minor scores which may exist in the flat-way. The test indicator 29 has its point 31 registering against the side wall of the V-way to be aligned. The test indicator is then set at zero. Since the other two surfaces are aligned, any misalignment of the V-way which is to be aligned will be indicated by the test indicator 29 as a plus or minus quantity and it can be eliminated thereafter by hand-scraping.

Fig. 8 shows my alignment detector being used to align one of the walls of a female dovetail way after the male V-way beneath the ball 20 and the flat-way beneath the foot 21 have been aligned relative to each other. Since the flat-way in this instance has a vertical side the foot or base 21 has been mounted on the standard 12 in the aperture 25 which is not directly opposite the slot 22. The test indicator 29 indicates whether the wall of the female dovetail way is true or not and the extent to which it is out of alignment.

Fig. 9 illustrates another method of utilizing one of my alignment detectors. Since the flat-way in this instance has been scored in a number of places and the user wishes to ignore these scores, since they will not affect the travel of the type of machine which is to be carried on the way if the higher surfaces are true, the flat-ring 44 is utilized beneath the ball 20 to true the flat-way against the female V-way, the standard 12 is threaded into the base or foot 21 within the slot 22 so that the sides of base 21 will travel along the walls of the V-way. The levels 36 and 37 will then register any misalignment of the flat-way relative to the V-way.

Fig. 10 illustrates the manner in which a chuck 51 or spindle (not shown) can be aligned with a bed-way so as to insure that any article formed by a machine carried on the bed-way will be true. To accomplish this the bed-way is first trued up as described above and then a test bar 50 which is known to be perfectly formed is inserted in the chuck 51. The registering point 31 is then brought to bear against the test bar 50 and the test indicator 29 is set at zero. Thereafter as the alignment indicator is moved along the bed-way, the extent to which the spindle is out of alignment will be registered on the test indicator 29. The setting of the spindle can be adjusted until the test indicator 29 shows that the spindle is true relative to the bed-way. Thereafter any shaft or other piece of equipment cut out by tools carried along the bed-way on a carriage will be true and accurately formed, since it will be held while being formed in a position which is essentially an extension of the trued spindle.

Prior to my invention, it has been practically impossible to parallel two V-ways accurately. With my machine alignment detector it is a simple procedure. First, the user aligns one of the V-ways with a flat-way with the detector as described above. Then the detector is positioned on the aligned V-way and the flat-way and the test indicator 29 is utilized to align the other V-way. This latter operation is shown in Fig. 3.

It can readily be seen that my machine alignment detector can be utilized to align any type of way regardless of its structure or shape without any difficulty and with a great saving of time and effort. In addition, and even more important, the accuracy of the alignment attained is greatly increased.

It will, of course, be understood that various changes may be made in the form, details, arrangement and proportions of the parts without departing from the scope of my invention.

What I claim is:

1. A machine alignment detector comprising a pair of spaced upright and parallel standards a stretcher extending between said standards, a base guiding member secured to the lower end portion of one of said standards and having two pairs of opposed longitudinally spaced supports adapted to be brought into contact with a surface of a machine over which the detector may be worked, one pair of said supports being disposed ahead and the other pair of said supports being disposed behind the standard to which said guiding member is secured to support the standard to which it is secured on essentially two points while the detector is worked, said base guiding member being adaptable and usable with all types of machine ways, a base secured to the lower end of the remaining standard, at least one of said standards being adjustable upwardly and downwardly on said stretcher and at least one of said standards being adjustable longitudinally of the stretcher, and a spirit level carried by said stretcher transversely thereof.

2. A machine alignment detector comprising a pair of spaced upright and parallel standards, a stretcher extending between said standards, at least one of said standards being adjustable upwardly and downwardly relative to said stretcher and at least one of said standards being longitudinally adjustable relative to said stretcher, an arch-like guiding member secured to the lower end portion of one of said standards and having two pairs of opposed longitudinally spaced supports, one pair of said supports being disposed ahead and the other pair of said supports being disposed behind the standard to which said guiding member is secured to support the standard to which it is secured on essentially two points while the detector is worked, said base guiding member being adaptable and usable with all types of machine ways, the other of said standards having a base formed to provide in substance a single-point support for its standard, and a spirit level carried by said stretcher transversely thereof.

3. A machine alignment detector comprising a pair of spaced parallel standards, a stretcher extending between said standards, an arch-like base guide member, secured to the lower end portion of one of said standards and having two longitudinally spaced pairs of opposed support portions adapted to be brought into contact with a surface of a machine over which the detector may be worked to support the standard to which it is connected on essentially two points while the detector is worked, a ball base secured to the lower end of the remaining standard and adapted to have point contact with a surface of a machine to be trued to thereby support said remaining standard while the detector is worked, at least one of said standards being adjustably upwardly and downwardly on said stretcher and at least one of said standards being adjustable longitudinally of the stretcher, and a spirit level carried by said stretcher longitudinally thereof.

4. The structure defined in claim 3, said spirit level being mounted on said stretcher for swinging adjustment relative thereto about the axis of said stretcher and for tilting adjustment about an axis transverse to said stretcher.

5. A machine alignment detector comprising a pair of standards, a stretcher, clamps connecting said stretcher to said standards and holding said standards in spaced parallel relation with the stretcher extending between the standards, said clamps permitting upward and downward adjustment of said standards relative to the said stretcher and also permitting adjustment of the spacing between said standards, an arch-like base member secured to one of said standards and having at two ends thereof opposing pairs of projecting supports to form an essentially two-point support, a ball base for the other of said standards, a ring receiving said ball base, a spirit level bracket mounted on said stretcher for both sliding and rotational adjustment, said bracket having a first spirit level receiving portion extending longitudinally of said stretcher and a second spirit level receiving portion extending normal to said stretcher, a first spirit level received in said first spirit level receiving portion and tiltably adjustable therein, a second spirit level receivable in said second spirit level receiving portion and tiltably adjustable therein, a clamp slidably and rotatably mounted on said stretcher, an arm swingably connected to said clamp, a test indicator adjustably mounted on said arm, and means for securing said clamp and arm to said stretcher with the clamp and arm disposed in any adjusted position.

6. A machine alignment detector comprising first and second upright standards, a stretcher extending between said standards and connected thereto between their respective ends and holding the same in spaced parallel relation, at least one of said standards being adjustable upwardly and downwardly relative to said stretcher and at least one of said standards being adjustable longitudinally of said stretcher, an arch-like foot secured to the lower end portion of said first standard, said foot having at each end thereof a longitudinally spaced pair of opposed support elements, the support elements of each of said pairs being spaced from each other to permit the foot to ride against two surfaces of a way of a machine and support said first standard while the detector is worked, a ball foot secured to the lower end of the second standard to support said second standard while the detector is worked, a spirit level mount carried by said stretcher, a spirit level carried in said mount and extending transversely of said stretcher, and a second spirit level carried by said stretcher and extending longitudinally of said stretcher whereby a flat-way and a male V-way may be aligned relative to each other.

7. The structure defined in claim 6, and a universally adjustable arm carried by said stretcher, and a test indicator carried by said arm whereby a female dovetail way may be aligned relative to the other two aforesaid mentioned ways after such ways are aligned relative to each other by working the detector along the V-way and flat-way with said test detector registering with a wall of the dovetail way.

8. The structure defined in claim 6 and a flat ended ring having a socket portion within which said ball foot may ride, said ring being adapted to bear against the surface to be trued.

9. The structure defined in claim 6, said first mentioned foot being in the form of a slotted hollow cylinder.

10. The structure defined in claim 6, said first mentioned foot being in the form of a slotted hollow cylinder, the slot being of greater width than the diameter of said first standard, said standard having its lower end threaded, said cylinder having a threaded opening formed therethrough adapted to receive said threaded end of said first standard in threaded engagement to permit said cylinder to be applied to the first standard with either the cylindrical surface downwardly or with the slotted surface downwardly.

11. The structure defined in claim 6, said first mentioned foot being in the form of a slotted cylinder, and means for connecting said cylinder to said first standard at at least two points spaced circumferentially of said cylinder.

12. A machine alignment detector comprising a pair of spaced parallel standards, a stretcher extending between said standards, at least one of said standards being adjustable upwardly and downwardly relative to said stretcher and at least one of said standards being longitudinally adjustable relative to said stretcher, an elongated arch-like foot secured to one of said standards transversely to said stretcher, said foot having opposed end portions each having a pair of spaced supports thereon adapted to be brought into contact with a surface of a machine over which the detector may be worked, one pair of said supports being disposed ahead and the other pair of said supports being disposed behind the standard to which said foot is secured to support the standard to which it is secured on essentially two points while the detector is worked, a ball base secured to the lower end portion of the remaining standard and adapted to provide essentially single point support for said remaining standard, and a spirit level carried by said stretcher and extending longitudinally thereof.

References Cited in the file of this patent

UNITED STATES PATENTS

| | | |
|---|---|---|
| 423,094 | Taylor | Mar. 11, 1890 |
| 449,609 | Green | Mar. 31, 1891 |
| 773,983 | Reisner | Nov. 1, 1904 |
| 1,016,254 | Dodds | Feb. 6, 1912 |
| 1,056,615 | Whitworth | Mar. 18, 1913 |
| 1,186,063 | Arkins | June 6, 1916 |
| 1,200,410 | Chemrinsky | Oct. 3, 1916 |
| 1,220,027 | Toney | Mar. 20, 1917 |
| 1,459,381 | Serkey | June 19, 1923 |
| 2,154,625 | Kleineschay | Apr. 18, 1939 |
| 2,170,824 | Liehtenwalner | Aug. 29, 1939 |
| 2,178,293 | Wogeck | Oct. 31, 1939 |
| 2,541,366 | Kennedy | Feb. 13, 1951 |
| 2,569,873 | Stacey | Oct. 2, 1951 |
| 2,635,345 | Samborski | Apr. 21, 1953 |

FOREIGN PATENTS

| | | |
|---|---|---|
| 273,105 | Great Britain | June 30, 1927 |
| 539,127 | Germany | Nov. 23, 1931 |
| 504,707 | Great Britain | Apr. 28, 1939 |

OTHER REFERENCES

American Machinist, page 801, May 21, 1931, article by Sherman.